United States Patent [19]
Saeki et al.

[11] Patent Number: 5,580,198
[45] Date of Patent: Dec. 3, 1996

[54] METHOD AND APPARATUS FOR MANUFACTURING AN ARTICLE IN THE FORM OF A SCROLL

[75] Inventors: Norio Saeki; Toshinori Kuniki; Toshiyuki Fusayasu; Toshimitsu Iwai, all of Hiroshima, Japan

[73] Assignee: Tovo Advanced Technologies Co., Ltd., Hiroshima-ken, Japan

[21] Appl. No.: 597,660

[22] Filed: Feb. 7, 1996

Related U.S. Application Data

[62] Division of Ser. No. 288,522, Aug. 10, 1994.

[30] Foreign Application Priority Data

Aug. 17, 1993 [JP] Japan ................................. 5-203303

[51] Int. Cl.[6] .................................................. B23C 3/00
[52] U.S. Cl. ........................................ 409/166; 409/199
[58] Field of Search ..................... 29/888.022; 409/76, 409/77, 123, 142, 165, 166, 168, 199, 197

[56] References Cited

U.S. PATENT DOCUMENTS 3,212,405  10/1965  Smith ................................ 409/199
4,664,570   5/1987  Tsukiji et al. ...................... 409/168
5,103,558   4/1992  Herrick et al. ..................... 409/166
5,172,464  12/1992  Kitamura et al. ................... 409/168

*Primary Examiner*—Daniel W. Howell
*Attorney, Agent, or Firm*—Jordan and Hamburg

[57] ABSTRACT

A tool is brought into contact with a radially outer part of an inner wall surface of a scrollwall along an X-axis at a position displaced from the center of a basic circle of an involute curve by a radius of the basic circle along a Y-axis. Thereafter, the tool and the scrollwall are relatively moved along the X- and Y-axes while rotating the scrollwall about the center of the basic circle and keeping a normal direction of the wall surface at a contact point with the tool parallel with the X-axis, so that the tool is brought into contact with the wall surface from the same wall surface. In this way, the inner wall surface the wall surface at the center and the outer wall surface can be continuously processed in the same direction. The processing can be easily corrected based on a processing error resulting from the deviation of the positional relationship from a predetermined one, with the result that the processing accuracy can be maintained at a satisfactory level.

3 Claims, 17 Drawing Sheets $t = t_o + 2\Delta t$ $t = t_o - 2\Delta t$ $t \simeq t_o$ $t \simeq t_o$

METHOD AND APPARATUS FOR MANUFACTURING AN ARTICLE IN THE FORM OF A SCROLL

This is a division of application Ser. No. 08/288,522, filed Aug. 10, 1994.

BACKGROUND OF THE INVENTION

The present invention relates to a method and apparatus for manufacturing an article in the form of a scroll for use in a compressor or like device incorporated in an air-conditioning equipment.

As a method for manufacturing a scrollwork has been known, for example, the method as disclosed in Japanese Unexamined Patent Publication No. 62-88507. This method is such that a tool is brought into contact with an inner or outer wall surface in the form of an involute curve of the work along an X-axis normal to a Y-axis corresponding with a radial direction of a basic circle of the involute curve with the center of the tool being displaced from the center of the basic circle along the Y-axis by the radius of the basic circle, and the work is rotated about the center of the basic circle while moving the tool and the work relative to each other along the X-axis, thereby processing the wall surface.

According to this method, the wall surface can be processed by moving the tool and the work relative to each other along the X-axis and rotating the work.

When the inner and outer wall surfaces in the form of the involute curve are processed one after the other in manufacturing the scrollwork, the direction in which the tool is brought into contact with one wall surface is opposite from the direction in which the tool is brought into contact with the other wall surface (180°) if the conventional method is simply applied. This causes a variety of difficult problems in correcting the positional relationship between the tool and the work during the processing. More specifically, when the positional relationship between the tool and the work deviates from a predetermined one due to mechanical or thermal factor, this results in an error in the contour of the involute curve portion. It is desirable to easily correct this positional relationship based on the contour error to thereby satisfactorily maintain the processing accuracy.

However, both the inner and outer wall surfaces of the scrollwork are generally formed into an involute curve. When the both wall surfaces are processed according to the above method, the correlation between the deviation of the positional relationship of the tool and the work and the contour error resulting therefrom tends to be complicated. The complicated correlation makes it difficult to conduct the above correction by a simple measurement.

SUMMARY OF THE INVENTION

It is an object of the invention to provide a method and apparatus for manufacturing a scrollwork, which solve the aforementioned problems residing in the prior art.

It is another object of the invention to provide a method and apparatus for manufacturing a scrollwork, which enables an easy correction of a positional relationship between a tool and the work by an easy measurement based on a contour error of the work after the processing, thereby satisfactorily maintaining the processing accuracy.

Accordingly, the invention is directed to a method for manufacturing a work including a scrollwall which is formed into an involute portion at other than opposite ends thereof, the involute portion having inner and outer wall surfaces forming involute curves having the same circle as a basic circle, comprising the steps of: bringing a tool into contact with a radially outer part of one wall surface of the involute portion at a position displaced from the center of the basic circle by a radius of the basic circle in one direction along a Y-axis corresponding with a radial direction of the basic circle from a normal direction of the wall surface; processing the one wall surface toward its radially inner part by relatively moving the tool and the work in one direction along an X-axis which is normal to the Y-axis and parallel with a tangential direction of the basic circle while rotating the work in one direction about the center of the basic circle; bringing the tool into contact with a radially inner part of the other wall surface at a position displaced from the center of the basic circle by the radius of the basic circle in a direction opposite from the one direction along the Y-axis from the same side as the processing of the one wall surface along a normal direction of the other wall surface; and processing the other wall surface toward its radially outer part by relatively moving the tool and the work in the same direction as the one direction along the X-axis while rotating the work in a direction opposite from the one direction about the center of the basic circle.

The method may include a method for manufacturing the work further having a center portion including a boundary point between the inner and outer surfaces, the center portion being formed into a shape other than the involute curve, the involute portion being formed at a portion of the scrollwall leading to the center portion. According to this method, the scrollwall is continuously processed from the radially outer part of the one wall surface through the center portion to the radially outer part of the other wall surface by bringing the tool into contact with radially outer part of one of the inner and outer wall surfaces of the involute portion along the normal direction of the wall surface, and moving the tool and the work along the X- and Y-axes while rotating the work about the center of the basic circle so that the normal direction of the wall surface at the contact point of the tool and the work is constantly kept along the X-axis.

According to the above methods, it is more preferable to control the rotating speed of the work and the relative moving speed of the tool and the work such that the feed speed of the wall surface of the work to the tool is constantly fixed.

The invention is also directed to an apparatus for manufacturing a work including a scrollwall which is formed into an involute portion at other than opposite ends thereof, the involute portion having inner and outer wall surfaces forming involute curves having the same circle as a basic circle, comprising: rotation means for rotating the work about the center of the basic circle; X-axis drive means for relatively moving a tool and the work along the X-axis corresponding with a radial direction of the basic circle; Y-axis drive means for relatively moving the tool and the work along a Y-axis corresponding with a radial direction of the basic circle and normal to the X-axis, and drive control means for controlling the rotation means, X-axis drive means and Y-axis drive means, such that the tool is brought into contact with a radially outer part of one wall surface of the involute portion at a position displaced from the center of the basic circle by a radius of the basic circle in one direction along the Y-axis from a normal direction of the wall surface, the one wall surface is processed toward its radially inner part by relatively moving the tool and the work in one direction along the X-axis parallel with a tangential direction of the basic circle while rotating the work in one direction about the center of the basic circle, the tool is brought into contact with a radially inner part of the other wall surface at a position displaced from the center of the basic circle by the radius of the basic circle in a direction opposite from the one direction along the Y-axis from the same side as the processing of the one wall surface along a normal direction of the other wall surface, and the other wall surface is toward its radially outer part by relatively moving the tool and the work in the same direction as the one direction along the X-axis while rotating the work in a direction opposite from the one direction about the center of the basic circle.

The apparatus may include an apparatus for manufacturing the work further having a center portion including a boundary point between the inner and outer surfaces, the center portion being formed into a shape other than the involute curve, the involute portion being formed at a portion of the scrollwall leading to the center portion. In this apparatus, the drive control means controls the rotation means, X-axis drive means and Y-axis drive means such that the scrollwall is continuously processed from the radially outer part of the one wall surface through the center portion to the radially outer part of the other wall surface by bringing the tool into contact with radially outer part of one of the inner and outer wall surfaces of the involute portion along the normal direction of the wall surface, and moving the tool and the work along the X- and Y-axes while rotating the work about the center of the basic circle so that the normal direction of the wall surface at the contact point of the tool and the work is constantly kept along the X-axis.

The drive control means preferably controls the rotating speed of the work and the relative moving speed of the tool and the work such that the feed speed of the wall surface of the work to the tool is constantly fixed.

With the above methods and the apparatuses, the involute portion is processed by first bringing the tool into contact with one wall surface of the involute portion along the X-axis, i.e., in the normal direction of the wall surface at the position displaced by the radius of the basic circle in a specified direction along the Y-axis and then bringing the tool into contact with the other wall surface from the same direction at the position displaced by the radius of the basic circle in a direction opposite from the specified direction along the Y-axis. Accordingly, the cutting error resulting from the positional relationship between the tool and the work can be found in the thickness of the scrollwall (i.e., distance between the inner and outer wall surfaces) after the processing. More specifically, assuming that the cutting error is fixed, an actual wall thickness is smaller than an objective wall thickness by twice the cutting error if the cutting error is positive, i.e., in the event of excessive cutting. On the contrary, the actual wall thickness is larger than the objective wall thickness by twice the cutting error if the cutting error is negative, i.e., in the event of insufficient cutting.

Thus, according to these methods and apparatuses, the direction and magnitude of the cutting error can be grasped only by measuring the thickness of the scrollwall after the processing and the positional relationship between the tool and the work can be easily corrected based on the cutting error.

Further, after one of the inner and outer wall surfaces of the involute portion is processed from the radially outer part toward the radially inner part, the other wall surface is processed from the radially inner part toward the radially outer part. Accordingly, the relative moving direction of the tool and the work and the rotating direction of the work are constantly fixed, with the result that the processing of the inner and outer wall surfaces can be processed while suppressing a moving amount low.

Moreover, the normal direction of the wall surface is kept along the X-axis while rotating the work about the center of the basic circle of the involute curve and the tool and the work are moved along the X- and Y-axes so as to maintain the contact state. Accordingly, the processing can be continuously carried out in the same direction from the radially outer portion of one wall surface through the wall surface of the center portion to the radially outer part of the other wall surface, the inner and outer wall surfaces of the involute portion can be processed only by moving the tool and the work relative to each other along the X-axis and rotating the work.

Furthermore, since the rotating speed of the work and the relative moving speed of the tool and the work are controlled such that the feed speed of the wall surface of the work to the tool is constantly fixed, the processing accuracy can be stabilized over the entire wall surface.

DETAILED DESCRIPTION OF THE PREFERRED EMBODIMENTS OF THE INVENTION

The preferred embodiments of the invention is described with reference to the accompanying drawings.

Figure 1:
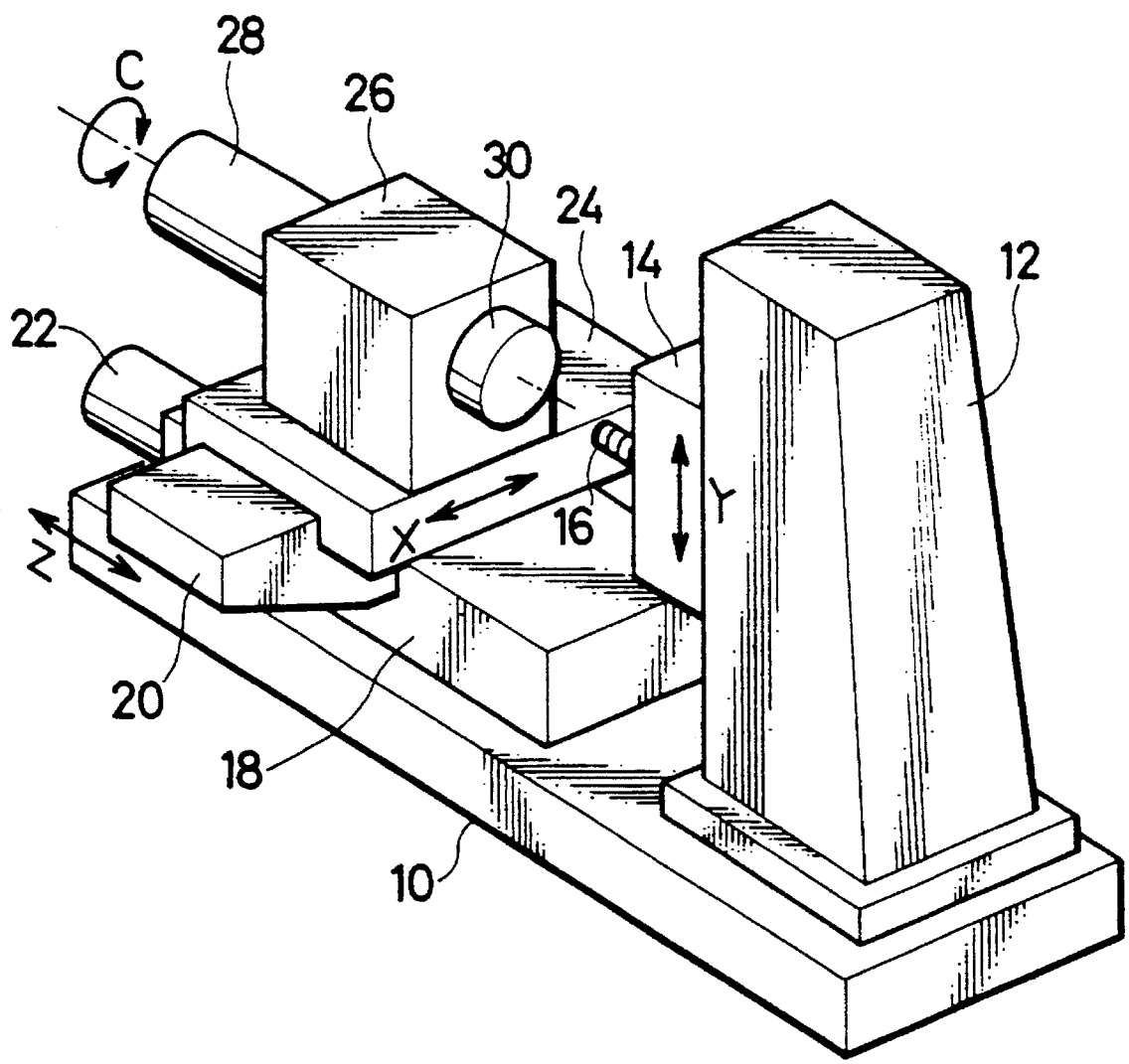
FIG. 1 is a perspective view entirely showing a scroll manufacturing apparatus as an embodiment of the invention.

In FIG. 1, a Y-axis column 12 stands upright on a bed 10 and a tool table 14 is mounted on the Y-axis column 12 movably upward and downward along the Y-axis column 12, i.e, in a Y-axis direction which is a vertical direction. The tool table 14 is provided with an unillustrated chuck for detachably holding a tool (in this embodiment, an end mill) and is driven to move upward and downward by a ball screw mechanism provided in the Y-axis column 12 and a Y-axis motor (Y-axis drive means) 13 shown in FIG. 3.

On the bed 10 is laid a rail 18 extending in a Z-axis parallel with a longitudinal axis of the tool 16. A Z-axis table 20 is mounted on the rail 18 slidably therealong. The Z-axis table 20 is driven to slide along the Z-axis by a Z-axis motor 22 and an unillustrated ball screw mechanism.

On the Z-axis table 20 is mounted an X-axis table 24 slidably along an X-axis which is normal to both the Z- and Y-axes. The X-axis table 24 is driven to slide along the X-axis by an X-axis motor (X-axis drive means) 25 shown in FIG. 3 and an unillustrated ball screw mechanism.

A headstock 26 stands on the X-axis table 24. The headstock 26 rotatably supports an unillustrated main shaft about a C-axis parallel with the Z-axis. This main shaft is driven to rotate about the C-axis by a C-axis motor (rotation means) 28 and detachably holds a scrollwork 30 by way of an unillustrated chuck.

Figure 2:
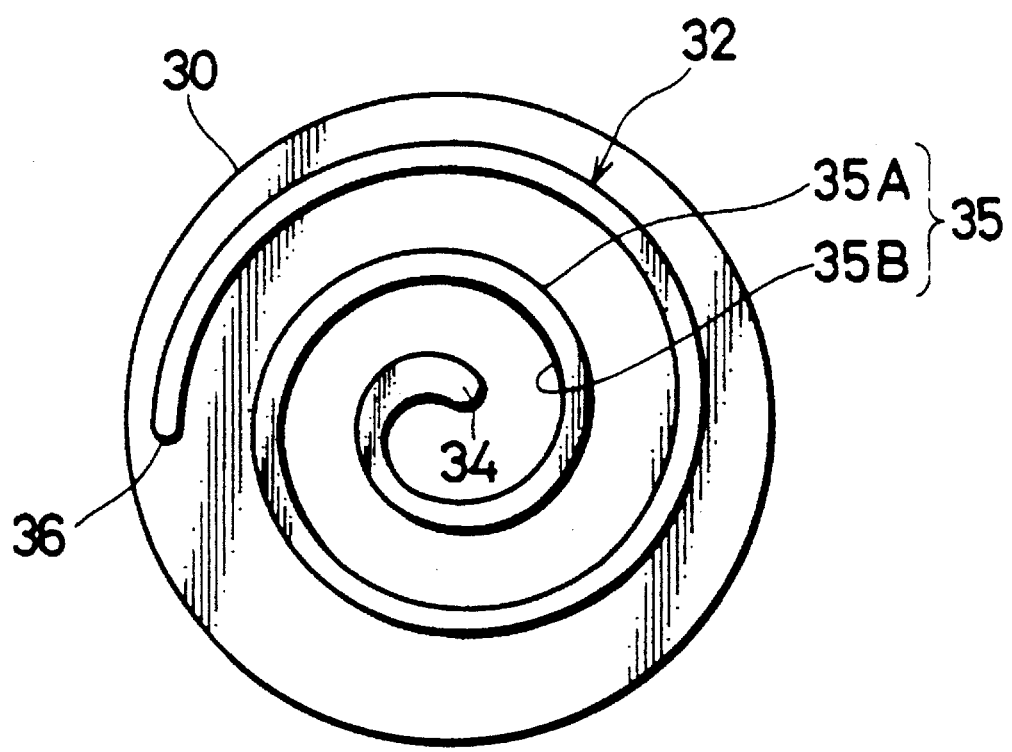
FIG. 2 is a front view showing an example of a scrollwork processed by the manufacturing apparatus.

As shown in FIG. 2, a scrollwall 32 projects forward on the front surface (a surface found in the plane of FIG. 2) of the scrollwork 30. The scrollwall 32 includes a center portion 34 and an involute portion 35. The center portion 34 is formed in a specified area including a boundary point between the inner and outer wall surfaces of the scrollwall 32, and has a contour of a non-involute curve such as an arc and a straight line. The involute portion 35 includes an outer wall surface 35A and an inner wall surface 35B holding the center portion 34 therebetween, and the wall surfaces 35A and 35B are formed into involute curves having the same circle as a basic circle. Accordingly, both the X-axis and the Y-axis are so set as to correspond with the radial directions of the basic circle.

Figure 3:
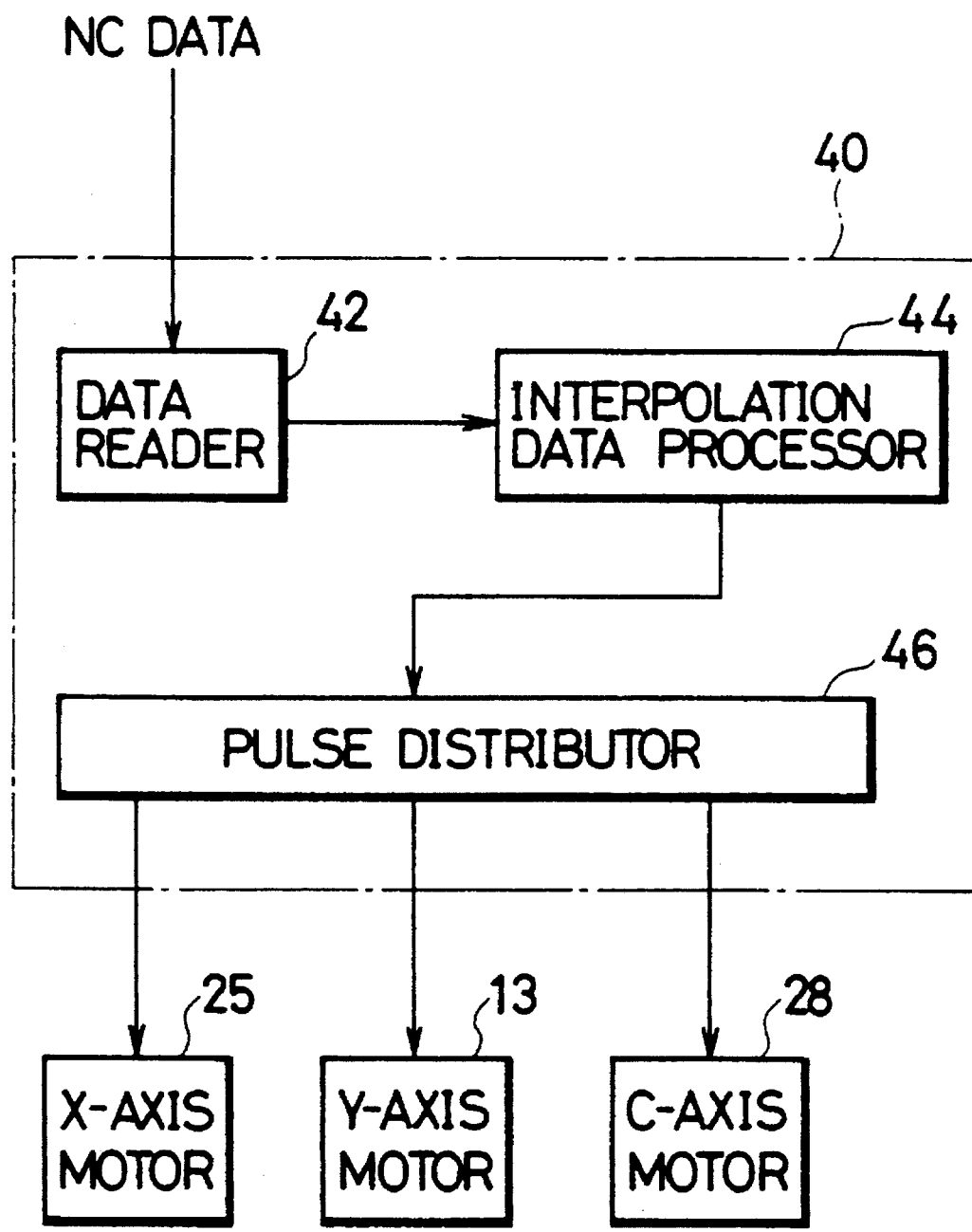
FIG. 3 is a block diagram showing a functional construction of a numerical controller provided in the manufacturing apparatus.

This manufacturing apparatus is provided with a numerical controller (drive control means) 40 as shown in FIG. 3. The numerical controller 40 activates the Z-axis motor 22 to thereby position the work 30 relative to the tool 16 and controls the operation of the X-axis motor 25, Y-axis motor 13 and C-axis motor 28 to process the scrollwall 32 in the work 30. This apparatus is further provided with a data reader 42, an interpolation data processor 44 and a pulse distributor 46 as functions involved in the processing control.

The data reader 42 reads and stores externally input numerical control data (the geometry of the scrollwall 32, feed speed. etc.). The interpolation data processor 34 calculates and outputs an interpolation data (to be described in detail later) required to process the scrollwall 32 in accordance with the data read by the data reader 42. The pulse distributor 46 distributes pulses with respect to the X-axis, Y-axis and C-axis based on the interpolation data and outputs the results to the respective motors 25, 13 and 28.

There is next described a method for manufacturing the scrollwall 32 which method is carried out by this apparatus.

Figure 4A:
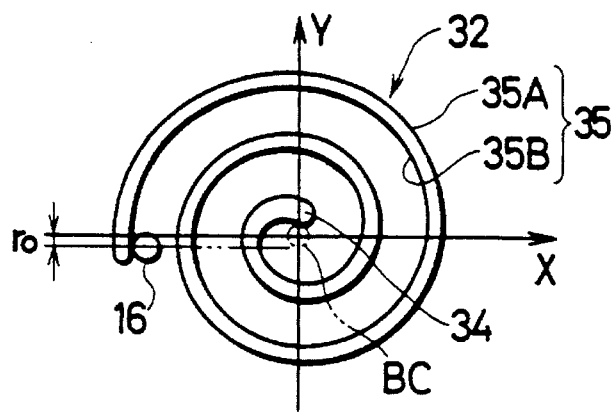
FIGS. 4A to 4C are front views showing how an inner wall surface of an involute portion of the scrollwork is processed.

As shown in FIG. 4A, the center of the tool 16 is relatively displaced from the center of the basic circle BC of the involute curve in a negative direction (downward) along the Y-axis by a radius ro of the basic circle. At this Y-axis position, the tool 16 is brought into contact with a radially outer part of the inner wall surface 35B of the involute portion 35 from the right to the left in the plane of FIG. 4A. At this time, the tool 16 may be brought into contact with a specified position while processing an outer end of the scrollwall 32 by its movements along the X-and Y-axes. In this state, a normal line of the inner wall surface 35B at the point where the tool 16 is in contact therewith is parallel with the X-axis.

Figure 4B:
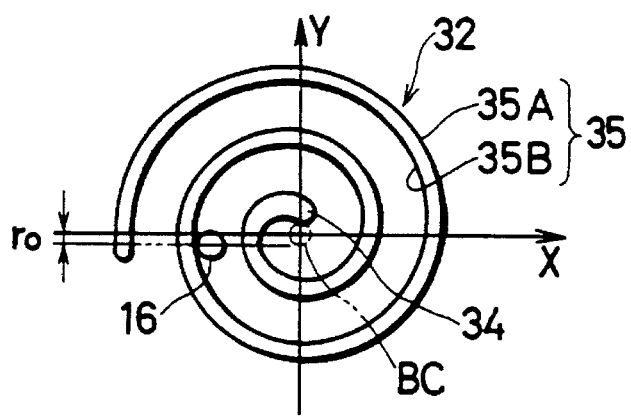
Figure 4C:
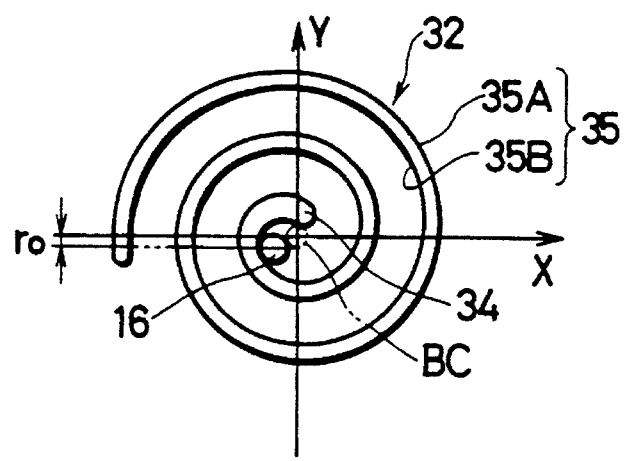

Subsequently, from this state, the work 30 is rotated counterclockwise in the plane of FIG. 4A about the center of the basic circle BC (about the C-axis) without changing the relative position of the tool 16 with respect to the Y-axis (i.e., without activating the Y-axis motor 13). The work 30 and the tool 16 are moved relative to each other along the X-axis by a reduction in the radius of the inner wall surface 35B resulting from the rotation of the work 30. By conducting the above operation, the inner wall surface 35B is formed from the radially outer part toward the radially inner part while keeping the normal line of the inner wall surface 35B at the point where the tool 16 is in contact therewith parallel with the X-axis as shown in FIGS. 4B and 4C.

Figure 5A:
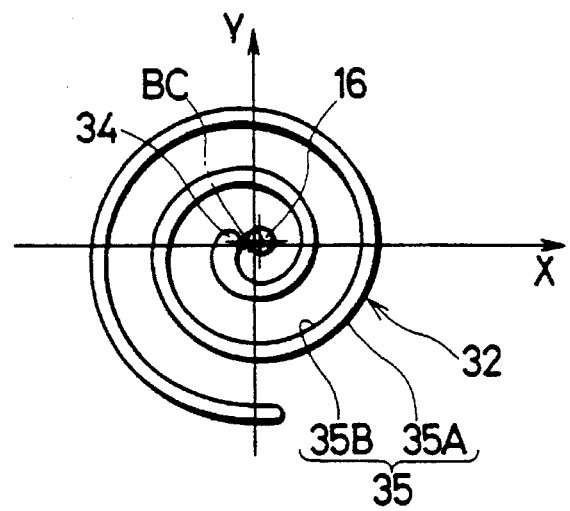
FIG. 5A is a front view showing how a center port ion in the scrollwork is processed.
Figure 5B:
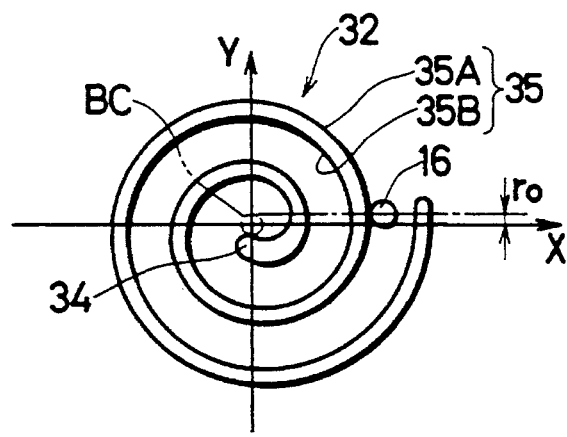
FIGS. 5B and 5C are front views showing how an outer wall surface of the involute portion of the scrollwork is processed.
Figure 5C:
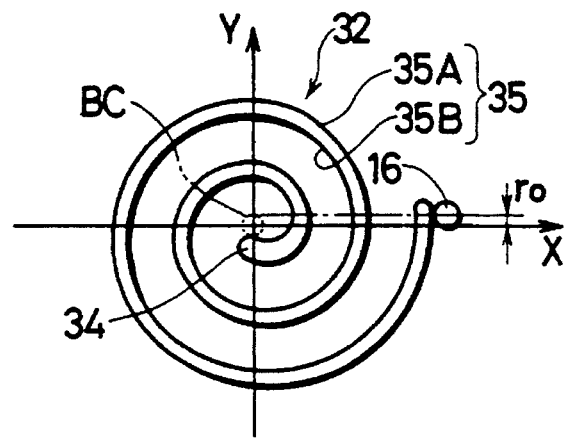
Figure 6:
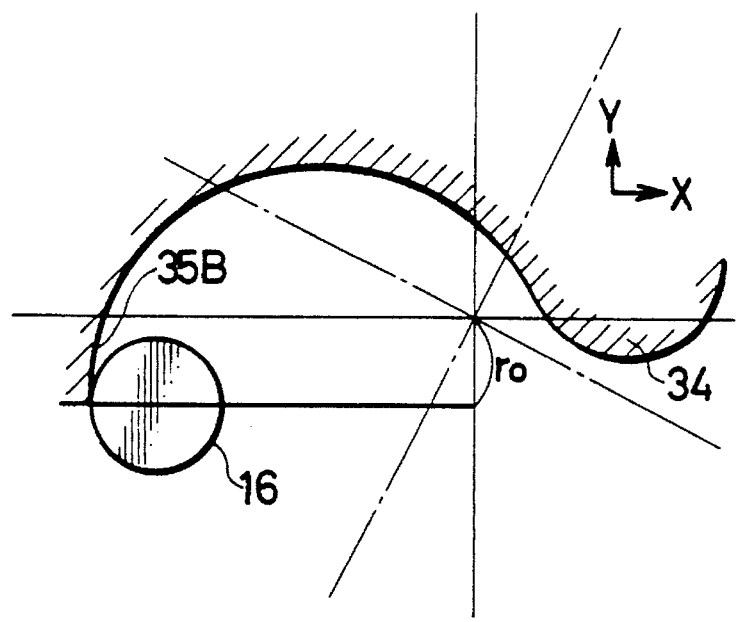
FIG. 6 is a front view showing how the scrollwork is processed in the vicinity of the center portion.
Figure 7:
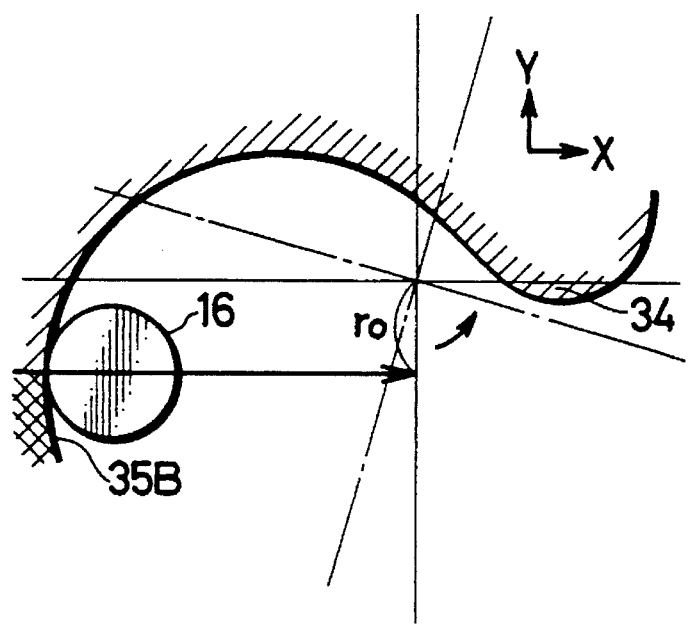
FIG. 7 is a front view showing how the scrollwork is processed in the vicinity of the center portion.
Figure 8:
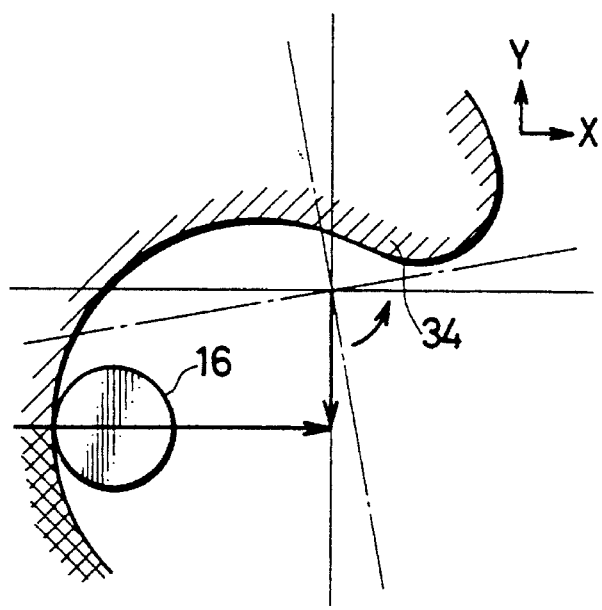
FIG. 8 is a front view showing how the center portion of the scrollwork s processed.
Figure 9:
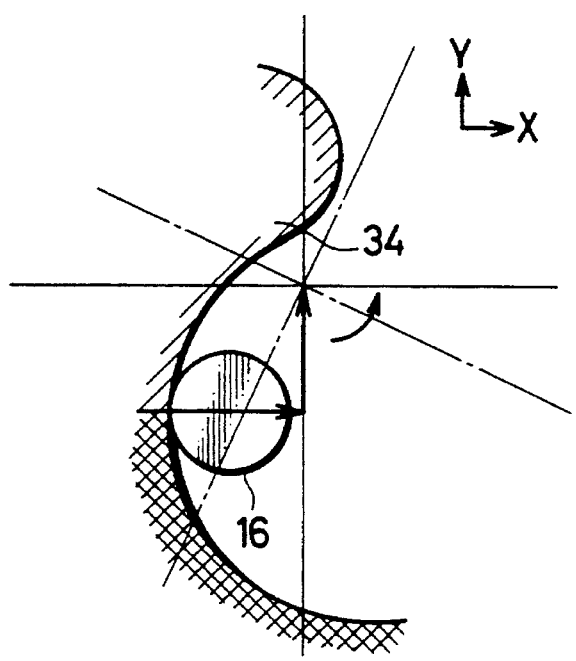
FIG. 9 is a front view showing how the center portion of the scrollwork is processed.
Figure 10:
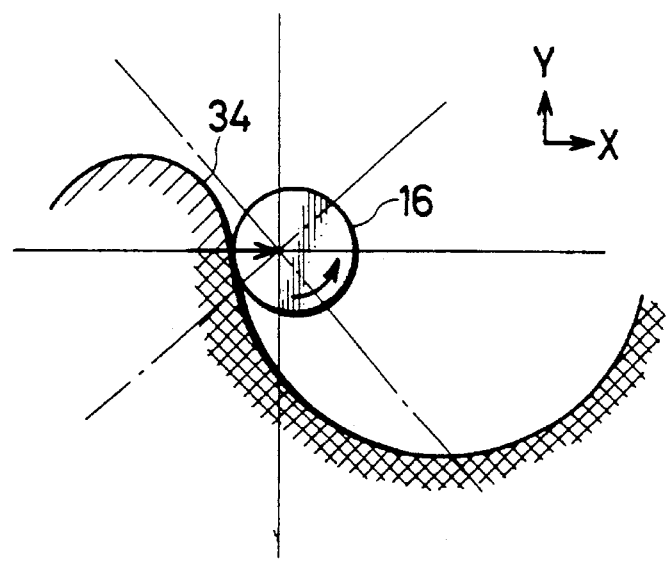
FIG. 10 is a front view showing how the center portion of the scrollwork is processed.
Figure 11:
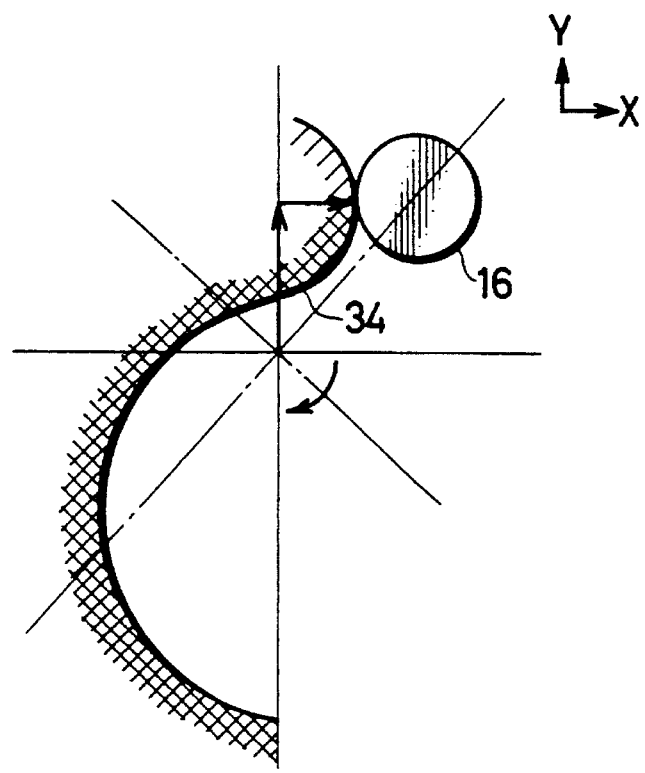
FIG. 11 is a front view showing how the center portion of the scrollwork is processed.
Figure 12:
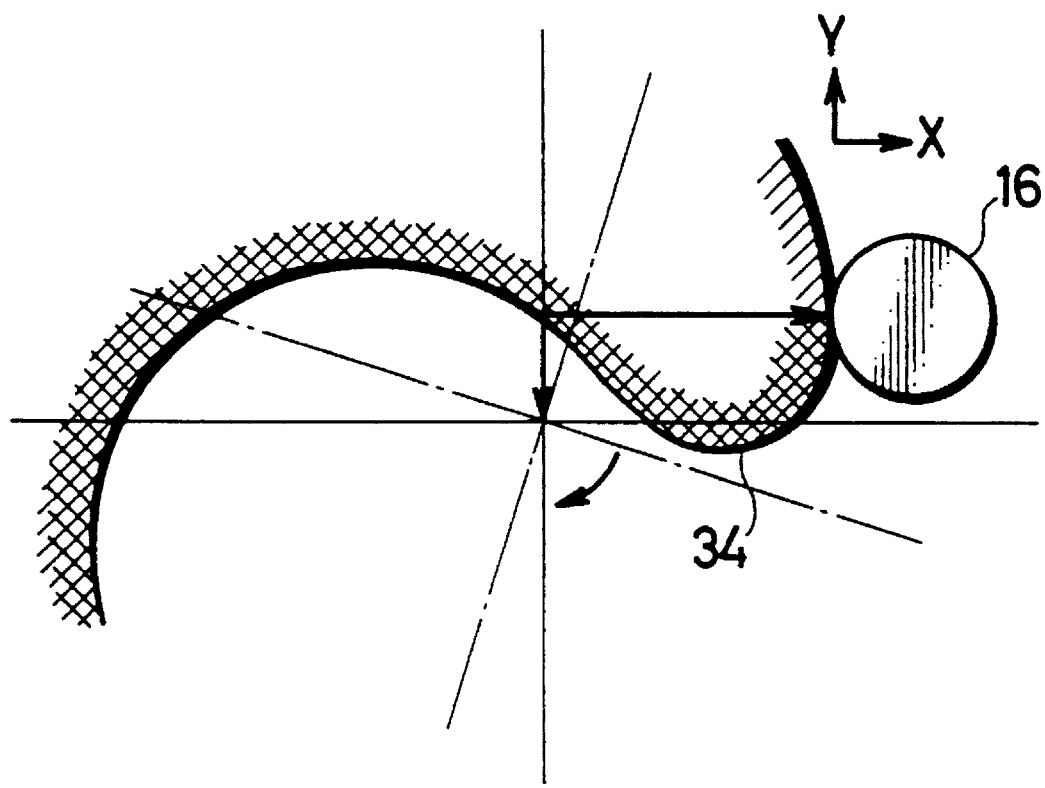
FIG. 12 is a front view showing how the scrollwork is processed in the vicinity of the center portion.
Figure 13:
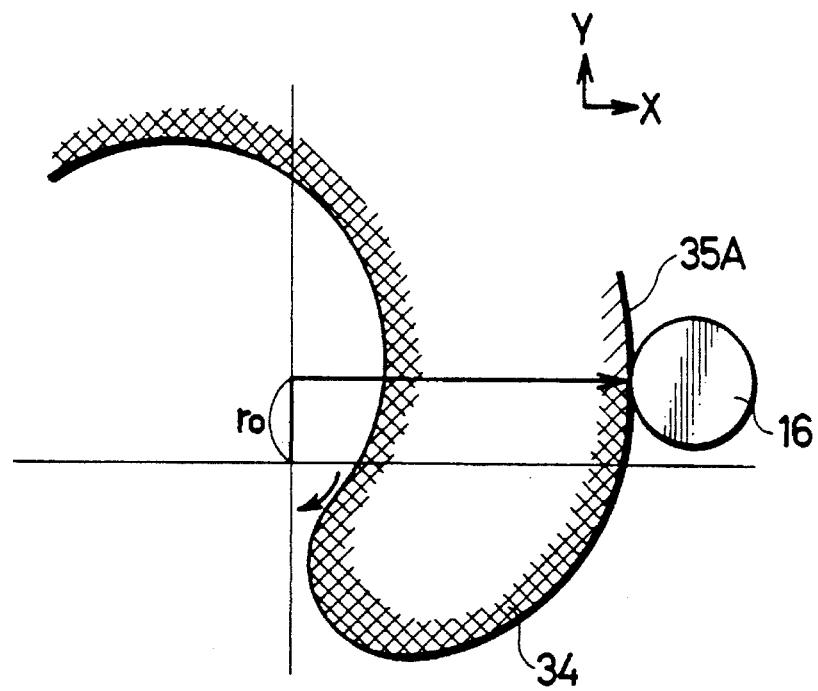
FIG. 13 is a front view showing how the scrollwork is processed in the vicinity of the center portion.
Figure 14:
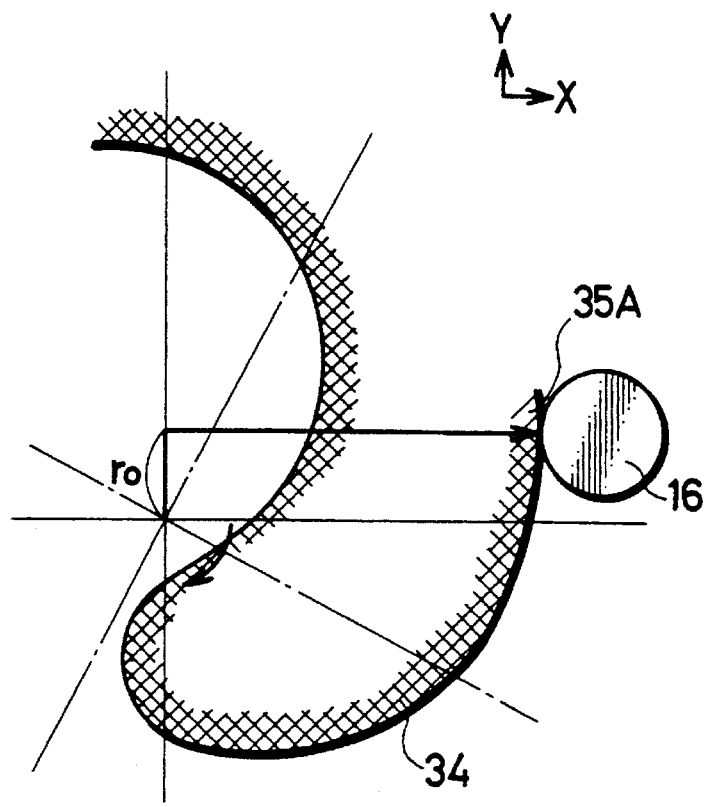
FIG. 14 is a front view showing how the scrollwork is processed in the vicinity of the center portion.

As the above processing proceeds, the tool 16 approaches the center portion 34 from the inner wall surface 35B of the involute portion as shown in FIGS. 6 and 7. Further, in an area for processing the center portion 35 shown in FIG. 5A, the tool 16 and the work 30 are moved relative to each other along the Y-axis direction as well as the relative movement thereof along the X-axis and the rotation of the work 30 about the C-axis as shown in FIGS. 8 to 11, so that the normal line of the center portion 34 at the point where the tool 16 and the work 30 are in contact can be always kept parallel with the X-axis.

As the processing for the center portion 34 proceeds, the tool 16 reaches an end point of the center portion 34. At this point, the tool 16 is automatically located at a position displaced from the center of the basic circle (in a positive direction) along the Y-axis by the radius ro of the basic circle. From this state, the work 30 is kept rotating about the C-axis without moving the tool 16 and the work 30 relative to each other in the same way as shown in FIGS. 4A to 4C, so that the tool 16 and the work 30 are moved relative to each other only along the X-axis. In this way, the outer wall surface 35A of the involute portion 35 can be continuously formed from its radially inner part to its radially outer part as shown in FIGS. 13, 14, 5B and 5C.

In other words, according to this method, the tool 16 is brought into contact with the point of the scrollwall 32 to be processed from the same side throughout the processing regardless of which point of scrollwall 32 is to be processed and the work 30 is rotated while constantly keeping the normal line of the wall surface at the contact point parallel with the X-axis. Accordingly, the scrollwall 32 can be continuously processed from the inner wall surface 35B of the involute portion 35 through the center portion 34 to the outer wall surface 35A. In order to carry out this method, the numerical controller 40 may be constructed so as to carry out a control operation, for example, as shown in FIG. 15.

Figure 15:
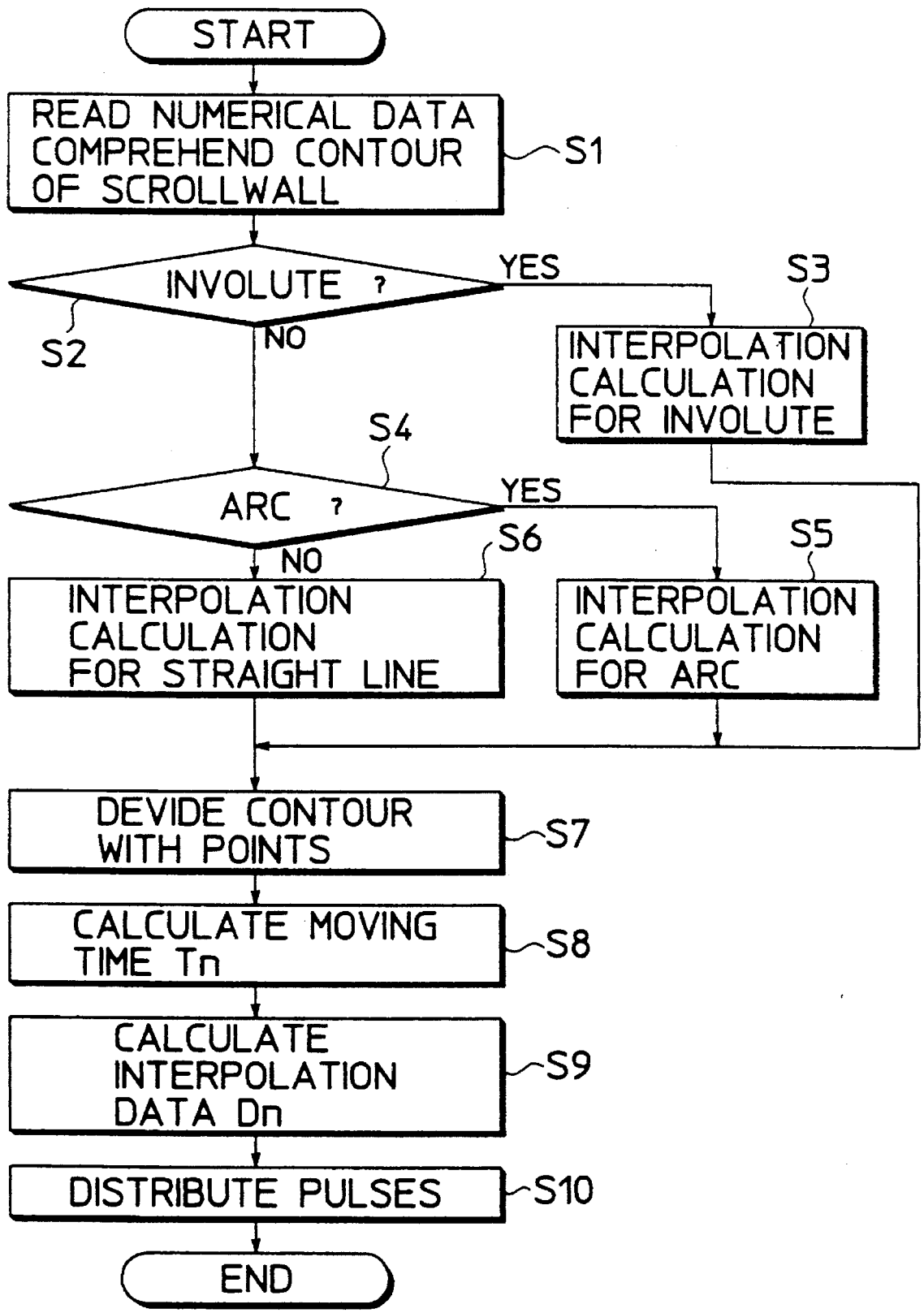
FIG. 15 is a flow chart showing a control operation carried out by the numerical controller.
Figure 16:
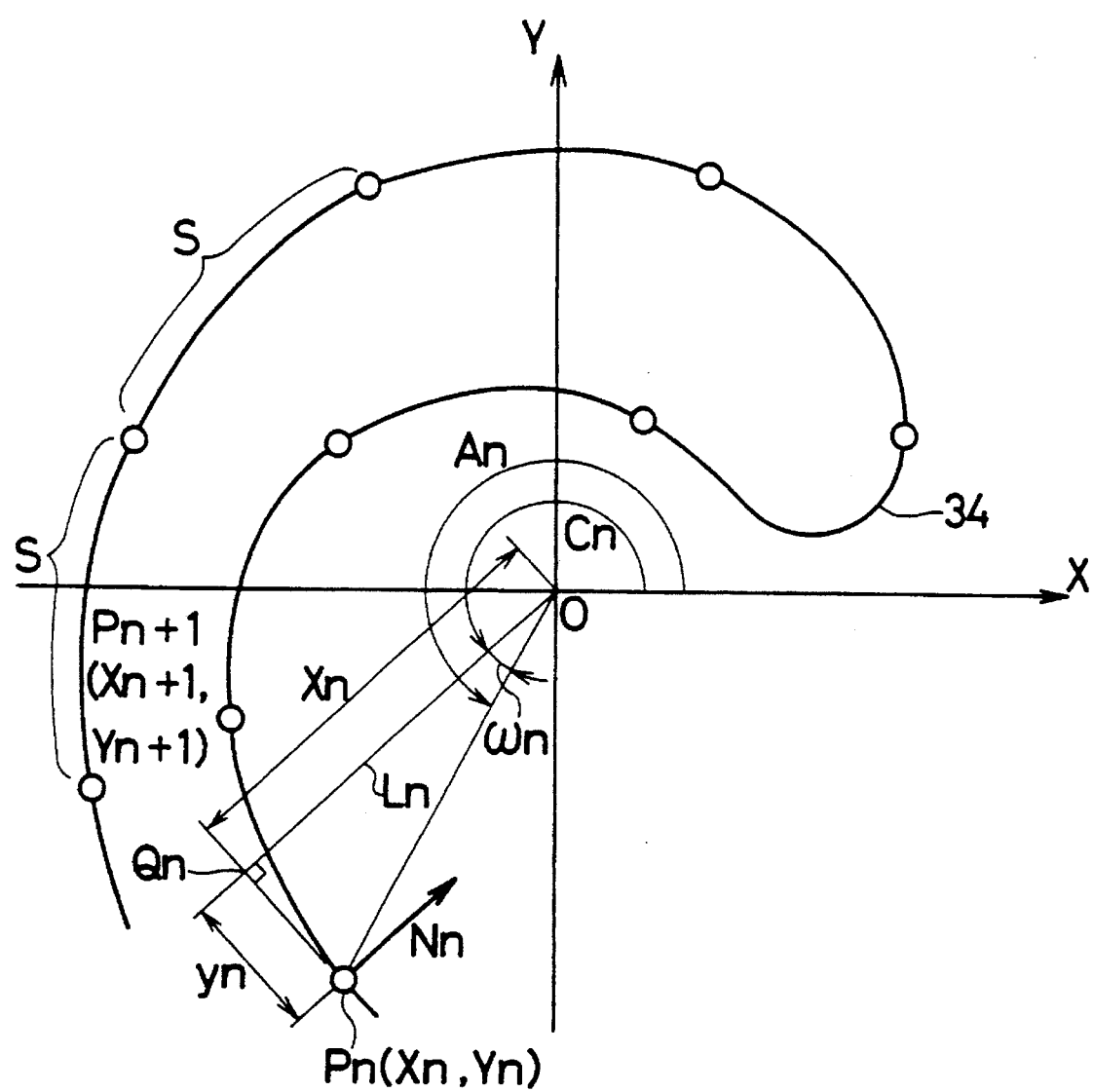
FIG. 16 is a diagram showing how an interpolation data is calculated by the numerical controller.
Figure 17:
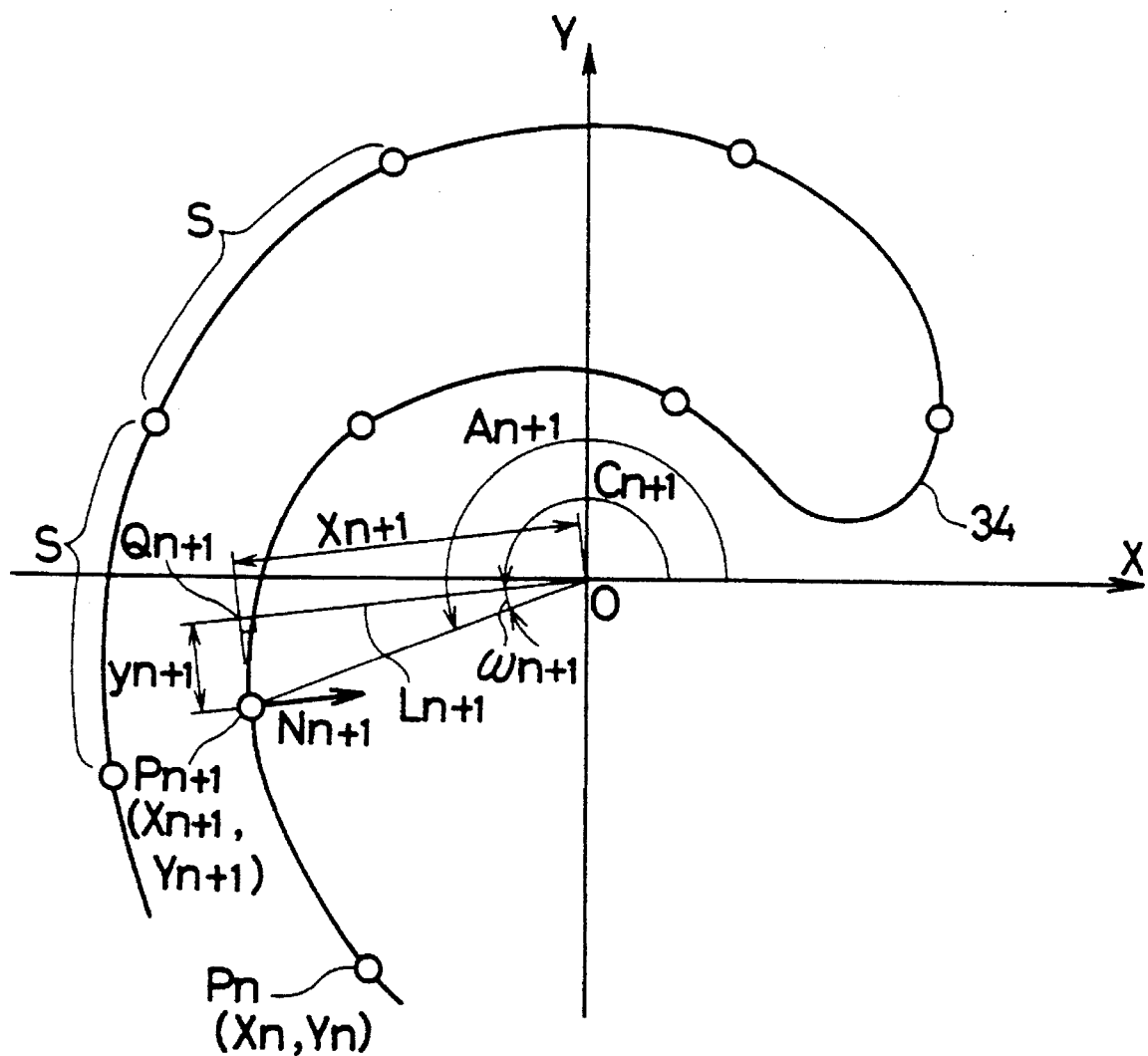
FIG. 17 is a diagram showing how the interpolation data is calculated by the numerical controller.

In FIG. 15, the numerical data are read to comprehend the contour of the scrollwall 32 to be processed (Step S1). Subsequently, the interpolation calculation is performed to divide the read contour by a plurality of points Pn (where is a natural number) so that each line segment between two consecutive points along the contour has a predetermined length S as shown in FIGS. 16 and 17 (Steps S2 to S7). In this embodiment, the interpolation calculation is performed according to the geometry of the contour. In a contour region composed of an involute curve, i.e., in the involute portion 35, the interpolation calculation for the involute curve is performed (Step S3). In a contour region composed of an arc in the center portion 34 (NO in Step S2 and YES Step S4), the interpolation calculation for the arc is performed (Step S5). In a contour region composed of a straight line in the center portion 34 (NO in Steps S2 and S4), the interpolation calculation for the straight line is performed (Step S6).

After dividing the contour with the points Pn, a moving time Tn required to move from the point Pn to the next point Pn+1 is calculated based on a designated feed speed F (mm/min) input by means of an external input device using the following equation.

[Equation 1]

$$Tn = \alpha \times S/F \text{ (msec)} \quad \alpha: \text{coefficient}$$

Since the distance S is fixed regardless of the value of n in this embodiment, all the values of Tn are equal. However, if the distance S varies depending upon the value of n (Sn), Tn also varies depending upon the value of n.

Subsequently, an interpolation data Dn is calculated which is a combination of a distance by which the tool 16 and the work 30 are relatively moved along the X- and Y-axes during the moving time Tn and an angle by which the work 30 is rotated about the C-axis (Step S9). In calculating the interpolation data Dn, an x-y coordinate system which is a relative coordinate system determined for each point Pn is employed in addition to an X-Y coordinate system which is an absolute coordinate system.

First, a normal vector Nn of the wall surface at a point Pn (Xn, Yn) as a starting point is calculated as shown in FIG. 16. A straight line Ln which is parallel with the normal vector Nn and passes through the center of the basic circle, i.e., an origin O of the coordinate system is an x-axis and an intersection of the straight line Ln and a tangent line to the wall surface at the point Pn is Qn. At this time, if a distance between the point Qn and the origin O is xn and a distance between the point Qn and the point Pn is yn, the point Pn can be expressed as Pn (xn, yn) in the relative coordinate system.

Accordingly, if the work 30 is rotated by an angle Cn about the C-axis until the straight line Ln overlaps the X-axis and, in this state, the contact point of the tool 16 with the wall surface is positioned at the point pn (xn, yn), the above-described processing can be carried out. Xn, Yn are calculated in accordance with the following equation.

[Equation 2]

$$Xn = Rn \cos \omega n$$

$$Yn = Rn \sin \omega n$$

where Rn denotes a distance between the origin O and a point Pn of processing.

Further, the angle Cn is calculated in accordance with the following equation.

[Equation 3]

$$Cn = An - \omega n$$

where $$An = \tan^{-1}(yn/Xn)$$

$$\omega n = \tan^{-1}(yn/xn)$$

Similarly, there are sequentially calculated a normal vector Nn+1, a straight line Ln+1, coordinates (xn+1, yn+1) in the relative coordinate system, and angles An+1, ωn+1, Cn+1 at a point Pn+1 (Xn+1, Yn+1). At this time, the interpolation data Dn for moving from the point Pn to the point Pn+1 during the moving time Tn can be obtained in accordance with the following equation.

[Equation 4]

$$Dn = (\Delta xn, \Delta yn, \Delta Cn, Tn) = (xn+1-xn, yn+1-yn, Cn+1-Cn, Tn)$$

Figure 18:
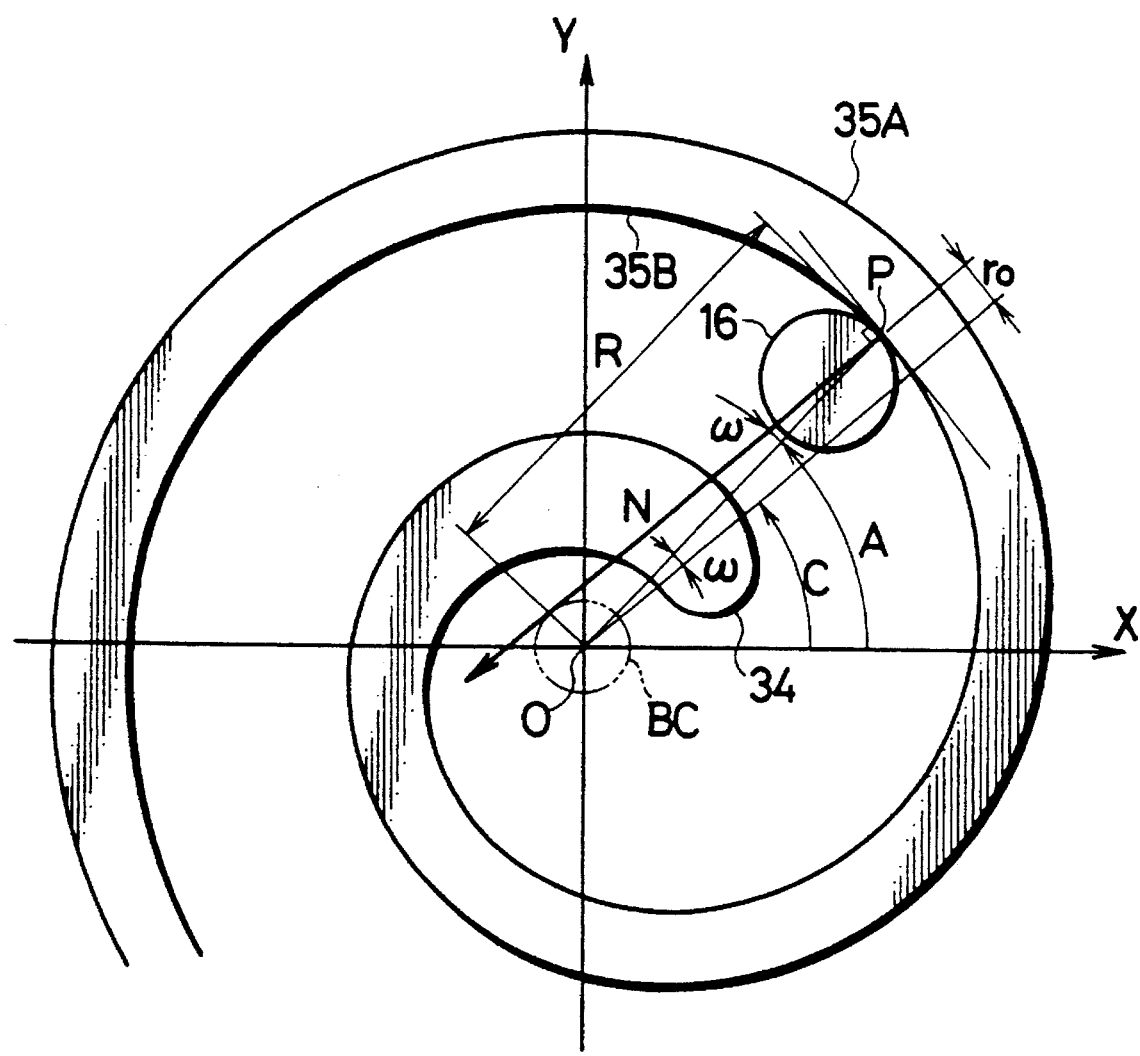
FIG. 18 is a diagram showing how the interpolation data is calculated by the numerical controller.

As a special case, x, y are expressed in the following equations when the tool 16 is in contact with the involute portion 35 as shown in FIG. 18.

[Equation 5]

$$X = R\cos \omega$$

$$y = R \sin \omega = ro \text{ (fixed)}$$

$$c = A - \omega$$

where R denotes a distance between the origin O and a point P of processing.

Based on the thus calculated interpolation data Dn, the pulses are distributed with respect to the respective X-, Y- and C-axes and output to the respective axis motors 25, 13 and 28 (Step S10). Through this distribution of the pulses can be realized the above-mentioned manufacturing method: the work 30 is processed by being rotated while the normal direction of the scrollwall 32 at the contact point with the tool 16 is constantly kept along the X-axis and the tool 16 is constantly brought into contact with the wall surface from the same side.

According to the manufacturing apparatus and method, the following effects can be obtained.

Figure 19A:
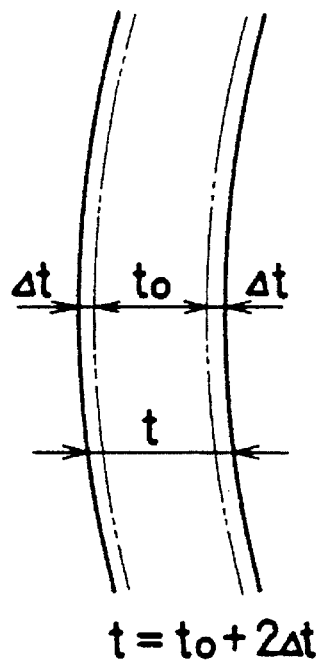
FIGS. 19A and 19B are diagrams showing relationship between an actual thickness and an objective thickness of a scrollwall in the event of insufficient cutting and in the event of excessive cutting in the method according to the invention, respectively.
Figure 19B:
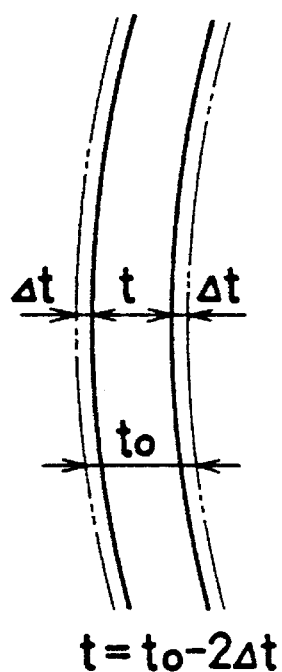

(a) The tool 16 is constantly brought into contact with the wall surface from the same side (from the right side in the illustrated examples) during the processing. Accordingly, even if the positional relationship between the tool and the work is deviated from a predetermined one due to a mechanical or thermal factor, the resulting processing error occurs in the same direction on the inner and outer wall surfaces. More specifically, when a processing error Δt occurs on the inner wall surface in a direction of insufficient cutting, it occurs on the outer wall surface in the direction of insufficient cutting. Thus, as shown in FIG. 19A, an actual wall thickness t after the processing is smaller than an objective wall thickness t0 by 2Δt. Further, when the processing error Δt occurs on the inner wall surface in a direction of excessive cutting, it occurs on the outer wall surface in the direction of excessive cutting. Thus, as shown in FIG. 19B, the actual wall thickness t after the processing is smaller than the objective wall thickness by 2Δt. Thereafter, the magnitude of the processing error Δt can be grasped to a certain extent by carrying out a simple operation of measuring the wall thickness and a proper correction can be made based on the measured processing error Δt during the next processing.

Since the tool 16 is constantly brought into contact with the wall surface, it can be kept in a desired posture. For example, by inclining the tool 16 in advance by a specified angle with respect to the Z-axis, the undesirable inclination of the tool 16 resulting from the cutting resistance can be prevented.

Figure 20A:
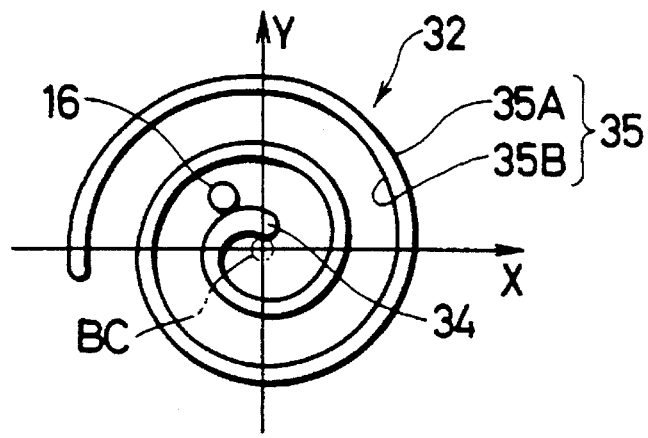
FIG. 20A is a front view showing how the center portion is processed according to another method.
Figure 20B:
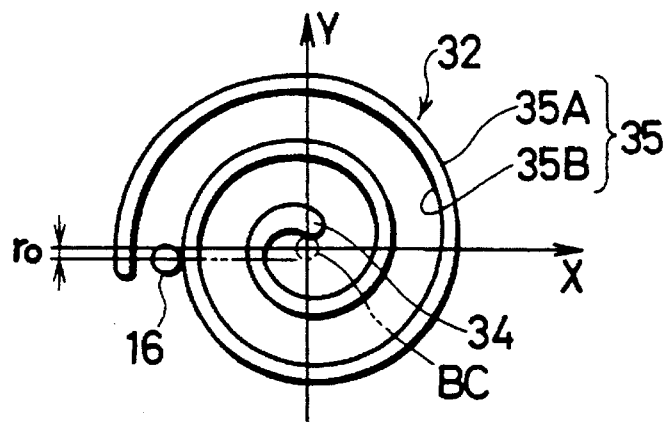
FIGS. 20B and 20C are front views showing how the outer wall surface of the involute portion is processed according to the another method.
Figure 20C:
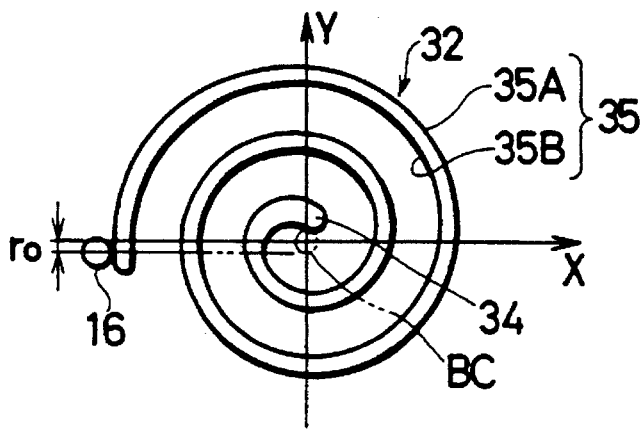
Figure 21A:
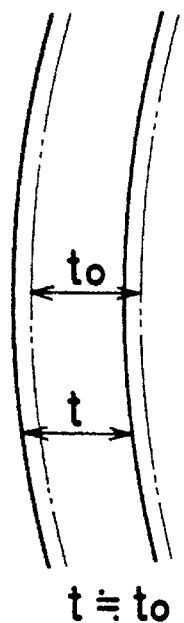
FIGS. 21A and 21B are diagram showing relationship between the actual thickness and the objective thickness of the scrollwall in the event where one wall surface is insufficiently cut and the outer wall surface is excessively cut according to the another method.
Figure 21B:
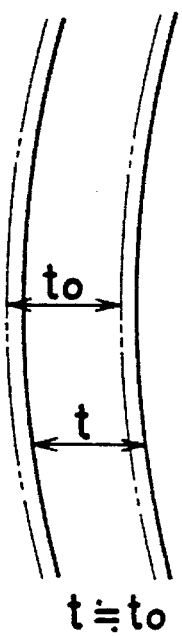

On the contrary, according to methods different from the inventive method, it is not easy to obtain a correction data necessary to reduce the processing error. These methods includes, for example, a method according to which, after the inner wall surface 35B is processed in the similar manner as shown in FIGS. 4A to 4C, the rotation of the work 30 is stopped and the tool 16 and the work 30 are moved relative to each other along X- and Y-axes as shown in Figs. 20A, thereby causing the tool 16 to reach the radially inner part of the outer wall surface 35A, and thereafter the outer wall surface 35A is processed while the tool 16 is brought into contact therewith from the left side in figures as shown in FIGS. 20B and 20C. According to this method, the tool 16 is brought into contact with the wall surface from the opposite directions during the processing of the inner and outer wall surfaces. Thus, when the excessive cutting occurs during the processing of one wall surface, the insufficient cutting occurs during the processing of the other wall surface as shown in FIGS. 21A and 21B. Consequently, the magnitude of the processing error Δt cannot be found in the wall thickness and the improper cutting takes deviation from the proper predetermined contour in the rotating direction. Measurement of such a deviation necessitates a complicated operation by use of a three-dimensional measuring device or like expensive device.

Further, since the directions in which the tool 16 is brought into contact with the wall surface are opposite in the case where the inner wall surface 35B is processed and in the case where the outer wall surface 35A is processed, the tool 16 must always be set in parallel with the Z-axis in order to process the both wall surfaces under the same conditions. Thus, the tool 16 cannot be kept in a desired posture.

The method disclosed in the foregoing embodiment simplifies the correcting operation after the processing, thereby easily realizing high processing accuracy, and permits the free selection of the posture of the tool 16.

(b) In processing the inner and outer wall surfaces 359 and 35A, the inner wall surface 35B is first processed from the radially outer part as a starting point to the radially inner part and then the outer wall surface 35A is processed from the radially inner part as a starting point to the radially outer part. Accordingly, the tool 16 and the work 30 move relative to each other in the same direction with respect to the X-axis, and a relative moving distance with respect to the X-axis can be minimized. Thus, the inner and outer wall surfaces can be efficiently processed while the moving amounts of the tool 16 and the work 30 are suppressed to lower levels.

It should be appreciated that this effect can be also obtained when the inner wall surface 35B is processed after the outer wall surface 35A.

(c) In processing the center portion 34, the X-Y-C axial control is executed to always keep the normal direction of the wall surface at the contact point with the tool 16 in parallel with the x-axis. The relative position of the tool 16 to the work 30 is automatically displaced in the opposite direction from the origin 0 along the Y-axis after the processing of the center portion 34, compared to the one before the processing of the center portion 34. Accordingly, the processing can be continuously carried out from the inner wall surface 358 (or the outer wall surface 35A) through the center portion 34 to the outer wall surface 35A (or the inner wall surface 35B) while constantly keeping the wall surface in contact with the tool 16. This leads to a more stable processing accuracy over the entire wall surface and an improved processing performance.

Particularly, according to this method, since the processing can be carried out on the basis of the same control theory regardless of whether or not the contour of the wall surface is an involute curve, the construction of the numerical controller 40 can be advantageously simplified while realizing the continuous processing of both the involute portion 35 and the center portion 34.

(d) Since the drive control is executed with respect to the respective X-, Y- and C-axes so that the feed speed of the wall surface of the work 30 to the tool 16 is constantly fixed during the above processing, the processing accuracy can be further stabilized.

The invention is not limited to the foregoing embodiment. but may be embodied in the following manners.

(1) Although the work 30 is moved along the X-axis and the tool 16 is moved along the Y-axis in the foregoing embodiment, the tool 16 may be moved along the X-axis and the work 30 may be moved along the Y-axis. Further, the X-and Y-axes in the invention are directions normal to each other and can be freely set provided that they correspond with the radial directions of the basic circle of the involute curve.

(2) The type of the tool 16 does not matter in the invention. There can be applied a variety of tools suitable to process a wall surface such as an end mill and a grinder.

(3) The invention can be widely applied for the processing of the scrollwall 32 whose inner and/or outer wall surfaces have at least partially an involute contour. The other parts of the inner and outer wall surfaces, e.g., an outer end 36 of the scrollwall 32 (FIG. 2) may have any desired geometry. Such parts may be processed suitably using the inventive processing method or other processing method.

(4) According to the invention, the time T may be fixed. The contour of the scrollwall 32 may be divided with points by calculating the distance S between the points Dn and Pn+1 based on the feed speed using the following equation. [Equation 6]

$$S_n = T \times F \times \alpha$$

In this case, if the feed speed F is fixed, Sn is also fixed.

(5) According to the invention, in processing the center portion, the tool may be moved beyond the radius of the basic circle along the Y-axis or may be stopped or moved backward along the X-axis depending upon the contour of the center portion.

As described above, the following effects can be obtained according to the invention.

In processing one wall surface of the involute portion, the contact point of the tool with this wall surface is displaced from the center of the basic circle by the radius of the basic along the Y-axis. Then, in processing the other wall surface, the contact point is displaced from the center of the basic circle by the radius of the basic circle in the opposite direction along the Y-axis. In this way, the tool is constantly brought into contact with the wall surface from the same side in processing the inner and outer wall surfaces. Accordingly, when the positional relationship between the tool and the work is deviated from a predetermined one due to the mechanical or thermal factor, the resulting processing error can be directly found in the wall thickness. Thus, by carrying out a simple operation of measuring the wall thickness, a correction amount necessary to correct the deviation of the positional relationship can be easily obtained. The processing accuracy can be satisfactorily maintained by making a correction.

The inner and outer wall surfaces can be processed under the same conditions without holding the longitudinal axis of the tool normal to the X- and Y-axes, thus the posture of the tool can be desirably set according to the processing conditions.

One wall surface is first processed from the radially outer part as a starting point to the radially inner part and then the other surface is processed from the radially inner part as a starting point to the radially outer part. Accordingly, the tool and the work move relative to each other in the same direction along the X-axis. Thus, the inner and outer wall surfaces can be efficiently processed while the relative moving amount of the tool and the work are suppressed to a minimum level.

In processing the inner and outer wall surfaces and the center portion, the respective axial controls are executed so that the normal direction of the wall surface at the contact point with the tool is constantly kept in parallel with the X-axis. Accordingly, the processing can be continuously carried out from one wall surface through the center portion to the other wall surface, thereby improving the processing efficiency, shortening a cycle time, and stabilizing the processing accuracy over the entire wall surface.

Since the processing can be carried out on the basis of the same control theory regardless of whether or not the contour of the wall surface is an involute curve, the construction of the drive control means can be advantageously simplified while realizing the continuous processing of both the involute portion and the center portion.

Since the drive control is executed with respect to the respective X-, Y- and C-axes so that the feed speed of the wall surface of the work to the tool is constantly fixed during the above processing, the processing accuracy can be further stabilized.

What is claimed is:

1. An apparatus for manufacturing a work including a scrollwall which is formed into an involute portion at other than opposite ends thereof, the involute portion having inner and outer wall surfaces forming involute curves having the same circle as a basic circle, comprising:

rotation means for rotating the work about the center of the basic circle,

X-axis drive means for relatively moving a tool and the work along the X-axis corresponding with a radial direction of the basic circle, Y-axis drive means for relatively moving the tool and the work along a Y-axis corresponding with a radial direction of the basic circle and normal to the X-axis, and drive control means for controlling the rotation means, X-axis drive means and Y-axis drive means, such that:

the tool is brought into contact with a radially outer part of one wall surface of the involute portion at a position displaced from the center of the basic circle by a radius of the basic circle in one direction along the Y-axis from a normal direction of the wall surface, the one wall surface is processed toward its radially inner part by relatively moving the tool and the work in one direction along the X-axis parallel with a tangential direction of the basic circle while rotating the work in one direction about the center of the basic circle, the tool is brought into contact with a radially inner part of the other wall surface at a position displaced from the center of the basic circle by the radius of the basic circle in a direction opposite from the one direction along the Y-axis from the same side as the processing of the one wall surface along a normal direction of the other wall surface, and the other wall surface is toward its radially outer part by relatively moving the tool and the work in the same direction as the one direction along the X-axis while rotating the work in a direction opposite from the one direction about the center of the basic circle.

2. An apparatus according to claim 1, the apparatus being adapted for manufacturing the work further having a center portion including a boundary point between the inner and outer surfaces, the center portion being formed into a shape other than the involute curve, the involute portion being formed at a portion of the scrollwall leading to the center portion, wherein the drive control means controls the rotation means, X-axis drive means and Y-axis drive means such that the scrollwall is continuously processed from the radially outer part of the one wall surface through the center portion to the radially outer part of the other wall surface by bringing the tool into contact with radially outer part of one of the inner and outer wall surfaces of the involute portion along the normal direction of the wall surface, and moving the tool and the work along the X- and Y-axes while rotating the work about the center of the basic circle so that the normal direction of the wall surface at the contact point of the tool and the work is constantly kept along the X-axis.

3. An apparatus according to claim 2, wherein the drive control means controls the rotating speed of the work and the relative moving speed of the tool and the work such that the feed speed of the wall surface of the work to the tool is constantly fixed.

* * * * *

UNITED STATES PATENT AND TRADEMARK OFFICE
CERTIFICATE OF CORRECTION

PATENT NO. : 5,580,198
DATED : December 3, 1996
INVENTOR(S) : Norio Saeki, et al.

It is certified that error appears in the above-indentified patent and that said Letters Patent is hereby corrected as shown below:

On the title page, item [3]:

Change the Assignee's name from "Tovo Advanced Technologies Co., Ltd." to --Toyo Advanced Technologies Co., Ltd.--

Signed and Sealed this

Twenty-second Day of April, 1997

*Attest:*

BRUCE LEHMAN

*Commissioner of Patents and Trademarks*

*Attesting Officer*